United States Patent [19]

Lugo

[11] Patent Number: 4,790,241
[45] Date of Patent: Dec. 13, 1988

[54] BAGEL BOARD DEVICE

[75] Inventor: John Lugo, Milford, Conn.

[73] Assignee: LBB Associates, Woodbridge, Conn.

[21] Appl. No.: 39,312

[22] Filed: Apr. 16, 1987

[51] Int. Cl.$^4$ ............................................... A21B 1/44
[52] U.S. Cl. ...................................................... 99/352
[58] Field of Search ................................. 99/352, 393

[56] References Cited

U.S. PATENT DOCUMENTS 2,614,483 10/1952 Scofield ................................. 99/393

Primary Examiner—Mark J. Thronson
Attorney, Agent, or Firm—Pasquale A. Razzano

[57] ABSTRACT

A device for holding a series of boiled food products and method for baking boiled food products including one or more carriages having pivotally mounted boards thereon for supporting the boiled food products. The carriages are positioned on a movable table adjacent to an opening of a rotatable oven such that each carriage may be disposed within the oven in successive shelves. Each of the boards of each carriage has a trip lever or handle movable between a first position, wherein the boiled food products rest on the boards in a generally horizontal position, and the second position, wherein the lever is rotated permitting the boiled food products to fall onto the shelf itself. A single carriage may also be repeatedly used in multiple shelves of the oven. The shelves of the oven each include a pair of spaced-apart guide rails which constrain lateral movement of the carriage when it is supported within the shelf. Each guide rail also has a front beveled member which aids in guiding the carriage into the shelf between the guide rails.

13 Claims, 14 Drawing Sheets

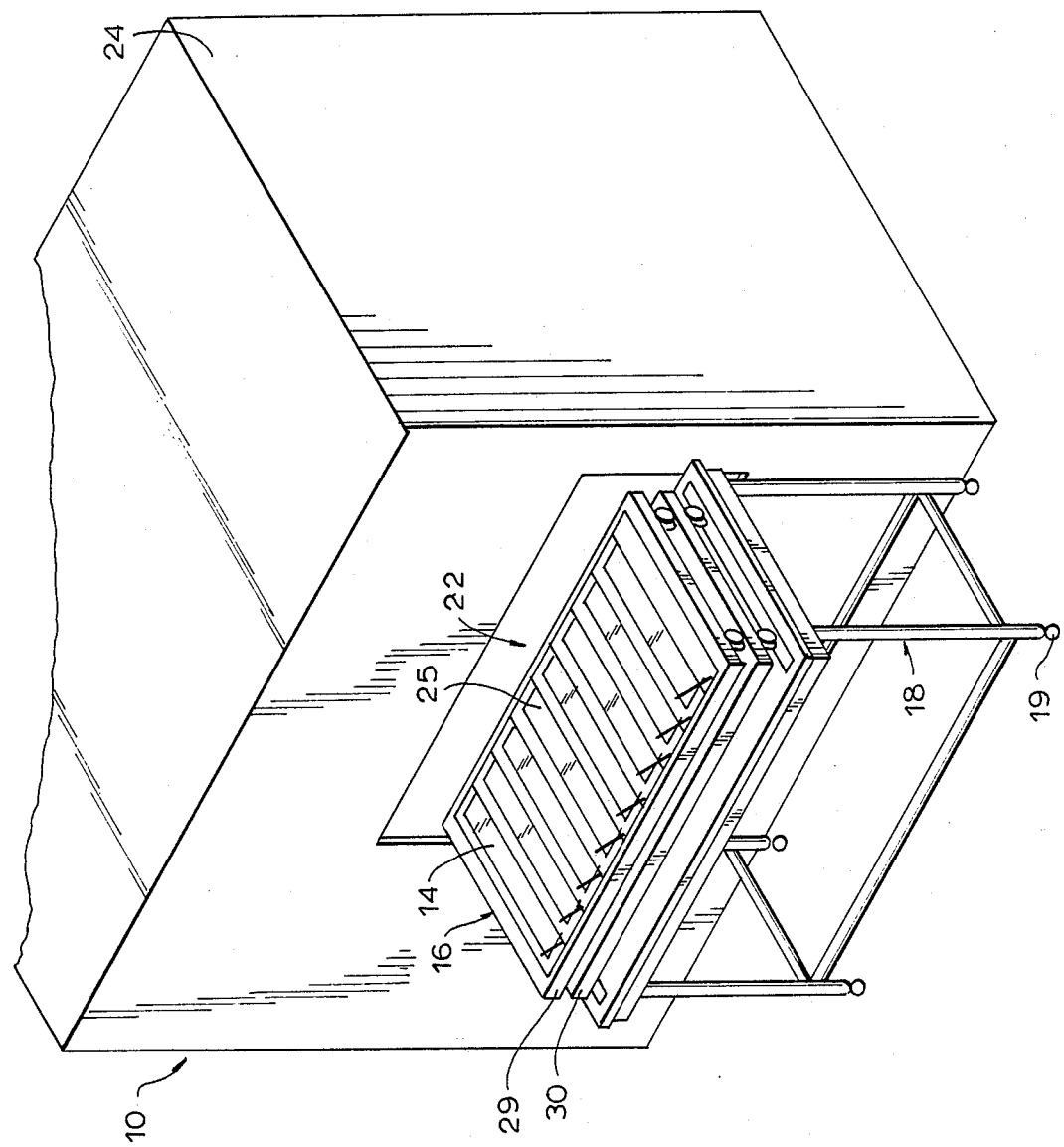
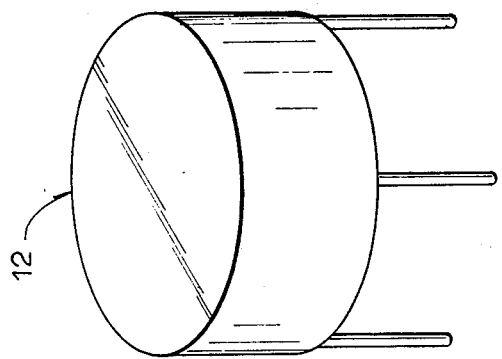
FIG. 1

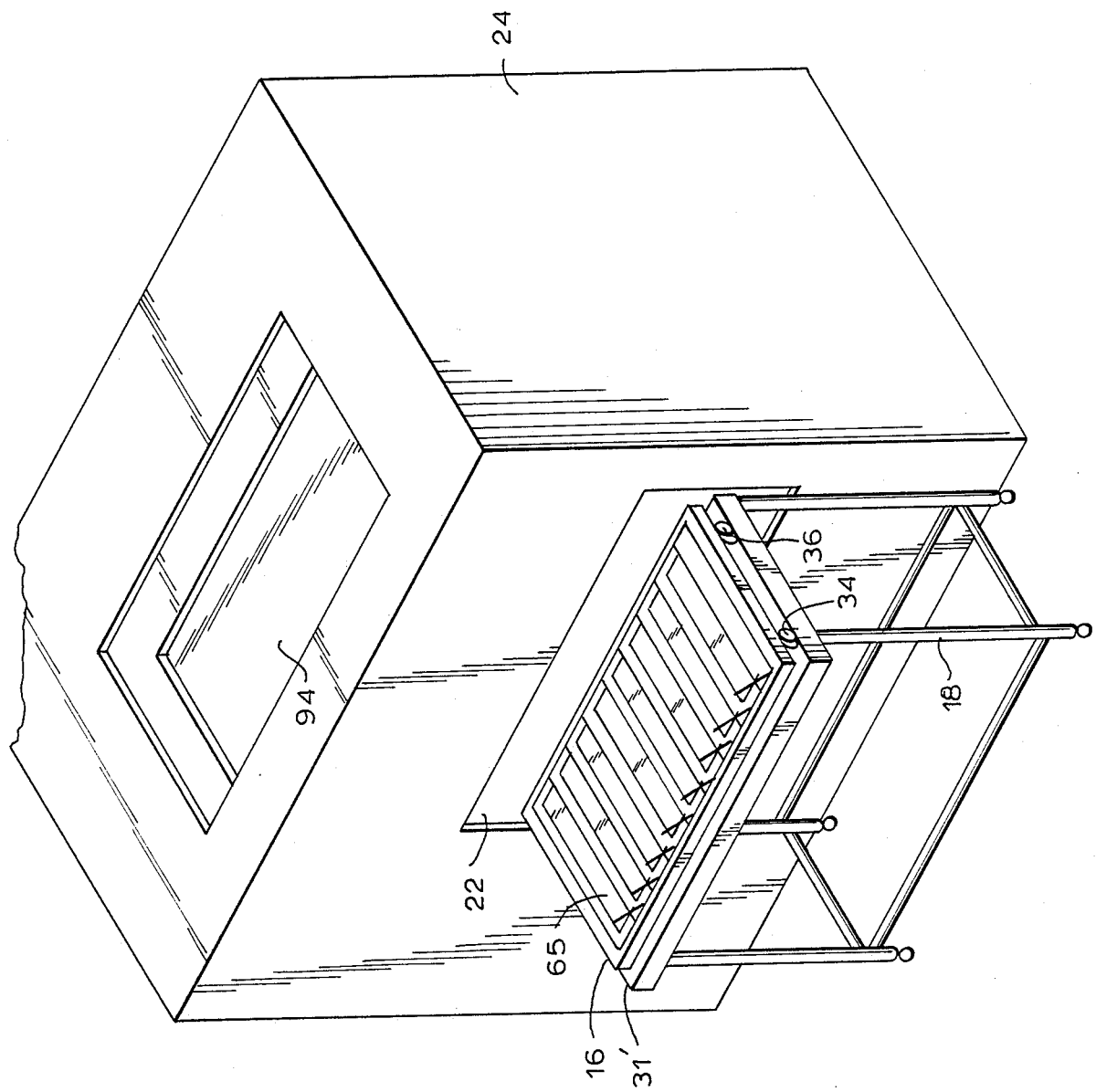
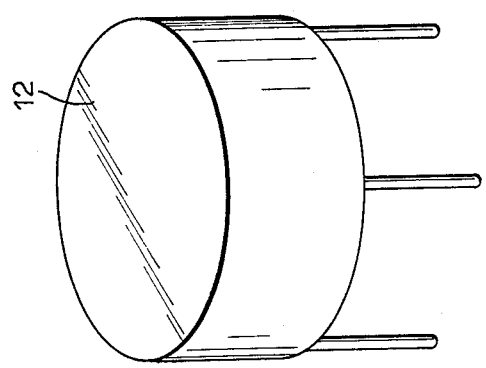
FIG. 14

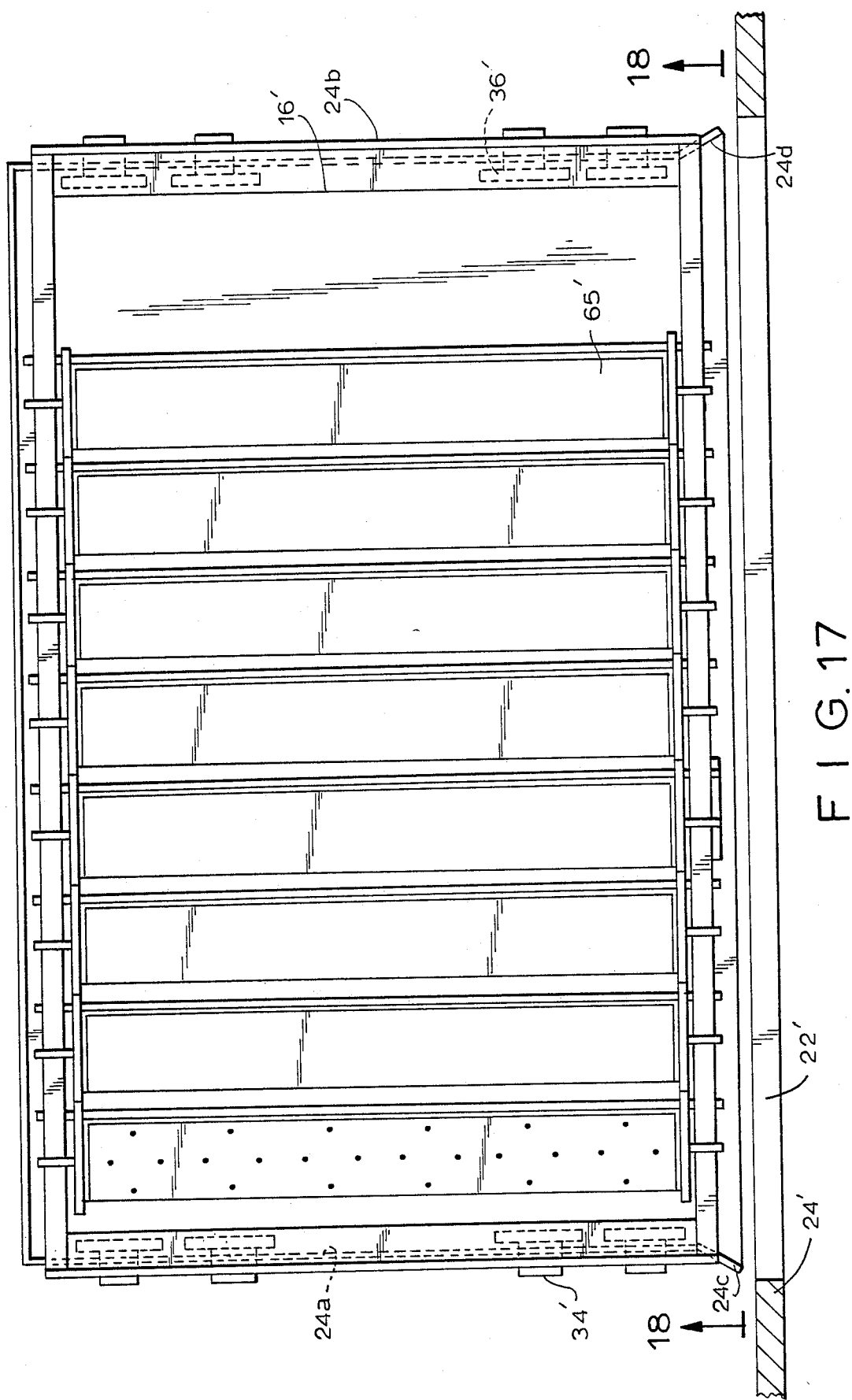

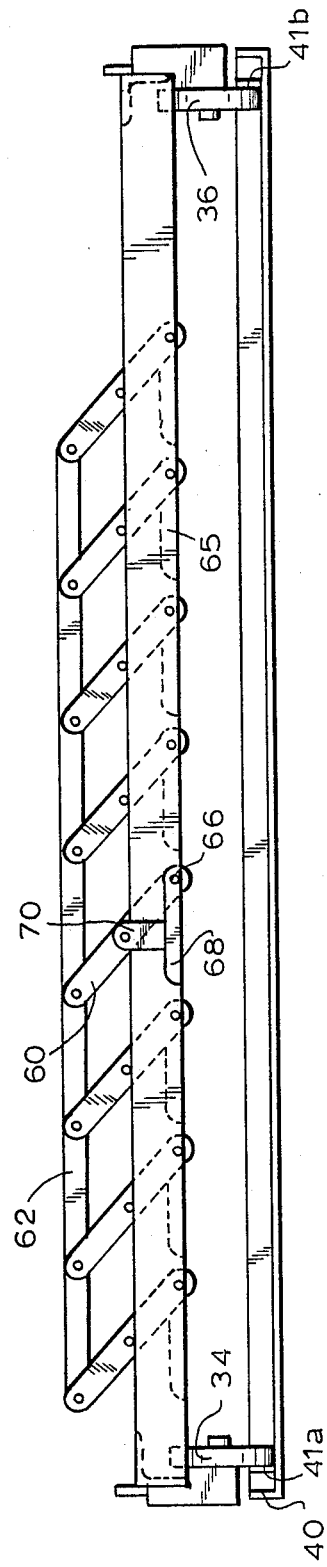

4,790,241

BAGEL BOARD DEVICE

BACKGROUND OF THE INVENTION

The invention relates to the field of carriages for use in holding boiled food products, and more particularly, for use in holding boiled bagels. In addition, the present invention relates to a method of drying and baking boiled food products.

In the past, after boiled food products, such as bagels, have been removed from a cooker, they have been placed on bagel boards usually 2"×4" and 25" long. These boards are covered with a burlap material. Prior to placing the bagels on the boards, the user douses the boards with water and places boiled bagels on wet boards. The wooden boards supporting the bagels are then inserted into the oven for a sufficient period to dry one side of the bagels. Once dried, the bagels are manually flipped onto the oven deck. The bagels remain in the oven until they are sufficiently baked. Such a system of baking boiled food products is extremely labor intensive in that the trays are manually removed from the oven after the bagels have been dried and the bagels are thereafter inverted and reinserted in the oven for continued baking.

OBJECTS OF THE INVENTION

It is a general object of this invention to provide a carriage for holding a series of boiled food products.

It is a further object of this invention to provide a single carriage consisting of a frame having a series of boards pivotally mounted therein for holding a series of boiled food products.

It is yet another object of this invention to provide a carriage consisting of a frame having a series of pivotally mounted boards which may be positioned on top of a moveable carriage and adapted to be received within an opening of a ferris wheel-like oven.

It is still a further object of this invention to provide one or more carriages holding a series of boiled food products which are placed in a ferris wheel-like oven such that after the boiled food products have been dried on each board, they may be flipped by a lever operatively connected single and multiple carriages to each board such that the boiled food products fall directly onto the shelves of the oven.

It is a still further object of this invention to provide a bagel board carriage having a plurality of pivotally mounted boards each supporting boiled food products above the shelf of an oven wherein a horizontal tie bar connects all the pivot levers of the carriage such that each board of the carriage is flipped simultaneously and all the boiled food products on each carriage fall simultaneously on the oven shelf when a trip lever operatively connected to only one of the pivot levers is lifted upwardly.

It is yet a further object of this invention to provide a single board carriage having a plurality of pivotally mounted boards thereon, such carriage being used repeatedly in multiple shelves of a rotatable oven.

It is a still further object of the present invention to provide guide rails within each shelf of the oven which guide the carriage into the shelf ad constrain lateral movement of the carriage within the oven.

Other objects and advantages of the invention will become apparent from the following detailed description and from the appended drawings in which like numbers have been used to describe like parts of the several views.

SUMMARY OF THE INVENTION

The present invention relates generally to a holder for boiled food products, and more specifically, to a carriage consisting of a frame having a series of boards pivotally mounted therein for holding a series of boiled food products. The boards are pivotally mounted on the carriage and each are operatively connected to a corresponding pivot lever. One or more carriage are positioned on a movable table and moved to a ferris wheel-like oven. If more than one carriage is utilized, the design of the carriages permits them to be received within successive shelves of the oven. In addition, the guide rails of the oven are specifically designed to readily receive the carriage within each shelf of the oven and constrain lateral movement of the carriage within each shelf.

After the boiled food products have been dried within the oven, each carriage is successively brought into alignment adjacent to and aligned with the opening of the oven. In this position, the pivot levers on each carriage are rotated to flip the bagels onto the shelves of the oven themselves for further drying. The carriages are then successively removed from the oven.

In accordance with another general object of the present invention, the pivot levers of each carriage may be operatively connected to a generally horizontal tie bar such that if the operator rotates or turns a trip lever operatively connected to one of the pivot levers, each pivot lever is rotated simultaneously thereby flipping or turning all the bagels on each carriage onto the corresponding shelf. This feature eliminates the necessity of turning each individual pivot lever of the carriage to rotate its corresponding board, and hence, minimizes labor time. This carriage may also be repeatedly used in multiple shelves of the oven as will be described further herein.

The present invention also relates to a method of baking boiled food products. In a first embodiment, the oven has a plurality of spaced-apart horizontal shelves mounted therein which rotate in a ferris wheel-like manner. When the movable table supporting a plurality of vertically-stacked carriages of a construction as aforedescribed is moved into a position adjacent to the opening of the oven, one of the carriages is rolled onto a first shelf. The oven is then rotated in a clockwise direction such that a second shelf is aligned with the opening of the oven. When the second shelf reaches the opening, a second carriage is rolled onto the second shelf. The oven is then rotated in a counter-clockwise direction to return the first shelf into a position aligned with the opening of the oven. In this position, the pivot levers on the first carriage are rotated to cause the bagels to flip over off the bagel boards onto the first shelf. The first carriage is then removed from the oven. Once this step is completed, the oven is then rotated in a clockwise direction returning the second shelf into a position adjacent to and aligned with the oven opening. The pivot levers on the second carriage are rotated to flip the bagels onto the second shelf of the oven. The second carriage is then removed from the oven. The process is then continued until all the pivot levers on each carriage are rotated to flip the bagels over onto each shelf of the oven.

In another embodiment of the present invention, a single carriage may be repeatedly used in multiple shelves of the oven. The oven is specifically designed to readily receive the carriage. Each shelf of the oven includes a pair of spaced-apart guide rails which constrain the carriage in the shelf. The front portion of each shelf guide rail is beveled inwardly such as to guide the carriage into the shelf between the guide rails.

With this design, after the wet bagels and removed from the cooker, they are sequentially placed on a plurality of pivotally mounted boards of the carriage which is supported on a movable table. The carriage as aforedescribed is moved into a position adjacent to the opening of the oven such that it is loaded into a first shelf of the oven constrained between the guide rails of the shelf. The carriage remains in this first shelf for one complete revolution (approx. two minutes) of the oven until the first shelf returns to a position immediately adjacent to the opening of the oven. In this position, the trip lever of the carriage is lifted upwardly such that each board of the carriage is angularly displaced simultaneously thereby flipping over the bagels onto the first shelf of the oven. The carriage is removed from the first shelf.

The carriage is once again loaded with bagels being mounted on the bagel boards. The oven is rotated such that a second shelf is brought into a position adjacent to the opening of the oven. The trip lever of the carriage is again lifted upwardly such that each board of the carriage is angularly displaced simultaneously thereby flipping over the bagels onto the second shelf. The carriage is once again removed from the oven. The bagel carriage is loaded into third, fourth, fifth, etc. shelves of the oven in a similar manner. After approximately fifteen minutes in the oven, the baked bagels supported within each shelf of the oven are removed through a door positioned on the top of the oven readily accessible to the operator.

BRIEF DESCRIPTION OF THE DRAWINGS

The following detailed description, given by way of example but not intended to limit the present invention solely to the specific embodiments described, may best be understood in conjunction with the accompanying drawings in which:

FIG. 1 is a front perspective view of a first preferred embodiment of an apparatus for holding a series of boiled food products;

FIG. 14 is a front perspective view of another embodiment of the present invention incorporating the carriage of FIGS. 11–13;

FIG. 17 is a top elevational view of the carriage being inserted in a shelf of the oven of FIG. 14; and FIG. 18 is a front elevational view taken along line 18—18 of FIG. 17.

DETAILED DESCRIPTION OF THE PREFERRED EMBODIMENTS

Figure 2:
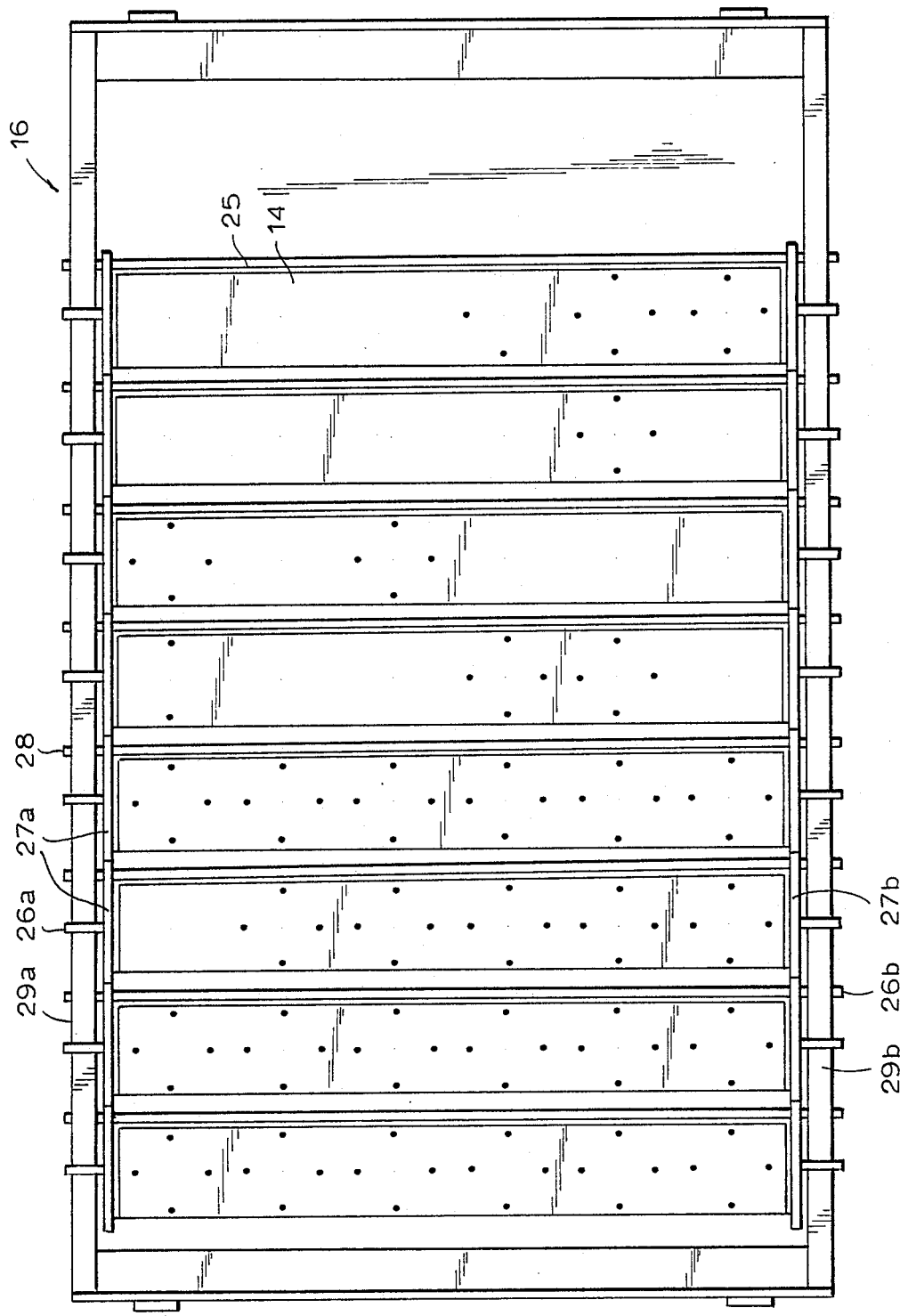
FIG. 2 is a top elevational view of the carriage of the first preferred embodiment of the present invention.

Referring now to FIG. 1, the present invention relates to a device 10 for holding a series of boiled food products and, in addition, a method for baking boiled food products. Specifically, the device 10 relates to a novel bagel board carriage.

As shown in FIG. 1, after boiling in a cooker 12, the boiled food products or bagels 14 are removed and placed on one or a series of vertically-stacked carriages 16 supported on a table 18 movable along the floor surface by table wheels 19. Since table 18 is movable, it can be positioned adjacent to and aligned with an opening 22 of an oven 24 such that carriages 16 can be readily received within opening 22 of the oven.

In order to support the bagels on each carriage, a plurality of Teflon-coated or canvas boards 25 are pivotally mounted thereon. In accordance with one of the general objects of the present invention, each board 25 is designed to pivot such that an operator can flip a series of bagels at one time off the boards. As is shown in FIG. 2, each board 25 is pivotally supported in carriage 16 by a retaining rod 26a and 26b extending outwardly from each end frame member 27a and 27b, respectively, of the board. This rod 26 rests against the top surface of the front and rear frame members 29a and 29b, respectively, of carriage 16 when the boards are supported within the carriage in a generally horizontal position. In this generally horizontal position, each board 25 supports a plurality of bagels 14 after the bagels have been removed from the cooker.

Figure 3:
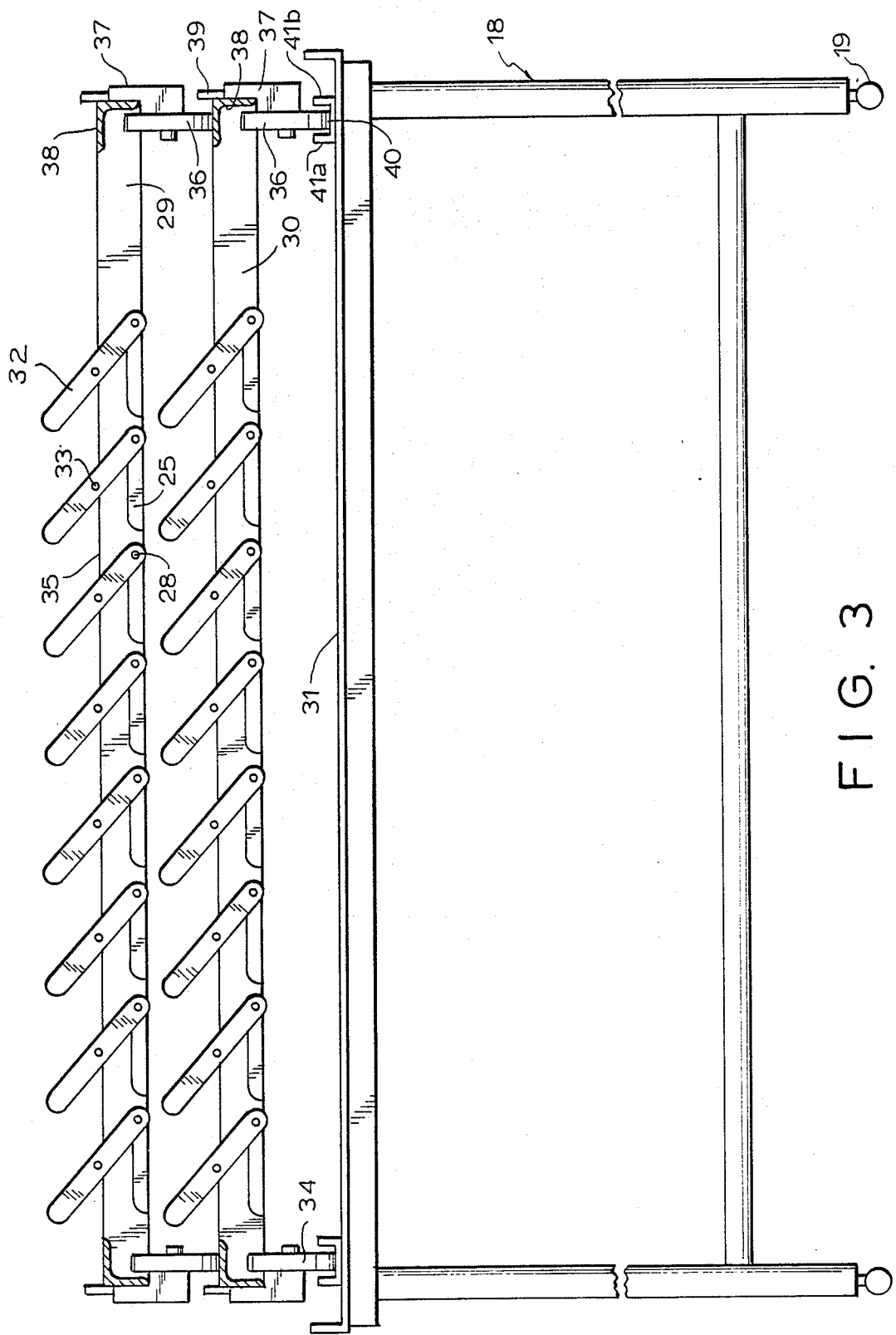
FIG. 3 is a side elevational view of the first preferred embodiment of the present invention wherein the #38 takes out of design boards of each carriage are pivotally mounted therein and the carriages are vertically-stacked and supported on a movable table.

As shown in FIGS. 2 and 3, the boards can be pivoted about pivot point 28 which extends through side members 29a and 29b of the carriage. In order to pivot the boards, each board 20 is operatively connected to a trip lever or handle 32 at pivot point 28. The operator can thus rotate trip lever 32 such that the corresponding board is angularly displaced from its generally horizontal position thereby causing the bagels supported on the board to fall off. The angular displacement of each board is limited by an abutment post 33 extending inwardly from lever 32. Abutment post 33 rests against top surface 35 of carriage 16 limiting the rotational movement of each trip lever 32.

For the purposes of illustration and not by way of limitation, FIG. 3 illustrates a plurality of carriages 16, namely a first carriage 29 and a second carriage 30, which are vertically-stacked and supported on the top surface 31 of movable table 18. In this stacked configuration, each carriage 16 is movable with respect to the other carriages of the vertical-stack of carriages as well as with respect to table 18 by means of each carriage having carriage wheels 34 and 36. These wheels 34 and 36 are mounted to carriages 16 by a wheel support structure 37 extending downwardly from each side surface of carriage 16. The wheel support structure 37 is mounted to an L-shaped rail supporting member 38.

The wheels 34 and 36 of the carriage immediately adjacent to the top surface 31 of table 18 (in FIG. 3, second carriage 30) are mounted within a piggy-back rail 40 between flanges 41a and 41b extending upwardly from piggy-back rail 40. This rail 40 supports second carriage 30 along top surface 32 of table 18. As a direct result of this design, piggy-back rail 40 constrains the wheels 34 and 36 of the carriage immediately adjacent to top surface 31 of table 18 from uncontrolled movement along top surface 31 and also guides carriage 30 into opening 22 of oven 24. The wheels of the next immediately adjacent carriage to the top surface of the table (in FIG. 3, first carriage 29) are supported on L-shaped rail supporting member 38 of the carriage positioned immediately below first carriage 29 in the vertical stack (i.e. second carriage 30). The first carriage 29 is constrained from uncontrolled movement along L-shaped rail supporting member 38 by abutment posts 39 extending upwardly from the second carriage 30. These abutment posts 39 also aid in guiding the first carriage into the opening of the oven.

Figure 4:
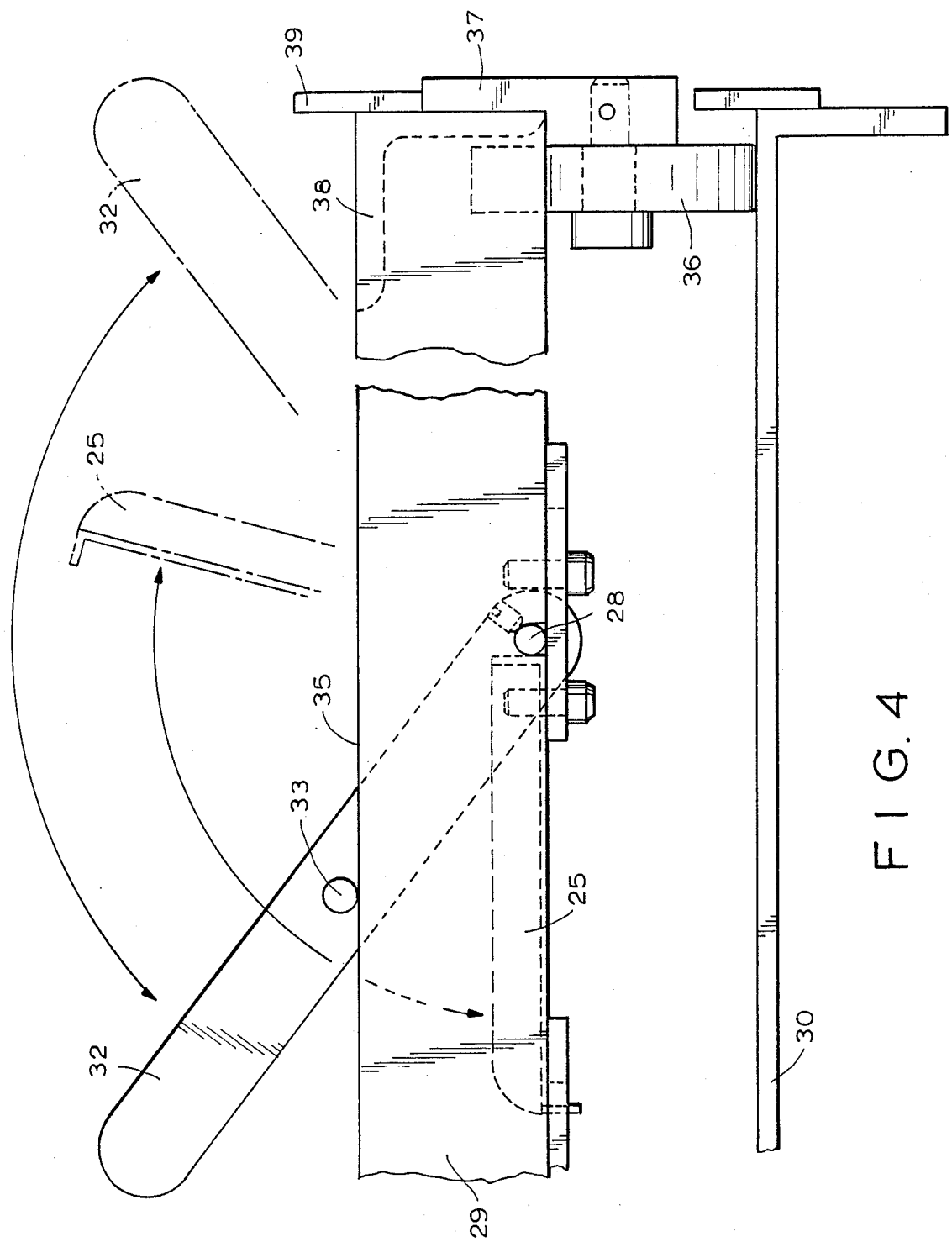
FIG. 4 is an enlarged side elevational view partly broken away of the carriage of the first preferred embodiment of the present invention specifically illustrating the rotation of the bagel boards.

The rotation of each trip lever 32, and in turn, its corresponding bagel board 25 is illustrated in FIG. 4. Each trip lever 32 is operatively connected to bagel board 25 at and is pivoted about pivot point 28. Trip lever 32 is pivotable between a first position and a second position. In the first position of trip lever 32, restraining rod member 33 of the trip lever rests against top surface 35 of the carriage. In this first position, each board 25 is mounted in a generally horizontal position such that it can support the bagels positioned thereon. Upon manually actuating the trip lever by lifting it upwardly, lever 32 is angularly displaced to its second position such that restraining rod member 33 again rests against top surface 35 of carriage 16 thereby limiting further rotational movement of trip lever 32. In this second position, lever 32 forces its corresponding board 25 to be raised upwardly angularly displaced from the horizontal axis of carriage 16. In this second position, the bagels placed on boards 25 can be flipped off the boards 25. As a result of this design, the operator does not have to physically touch each individual bagel to turn the bagel over nor does he have to remove each bagel from the oven to flip them when each carriage is supported within the oven.

Figure 5:
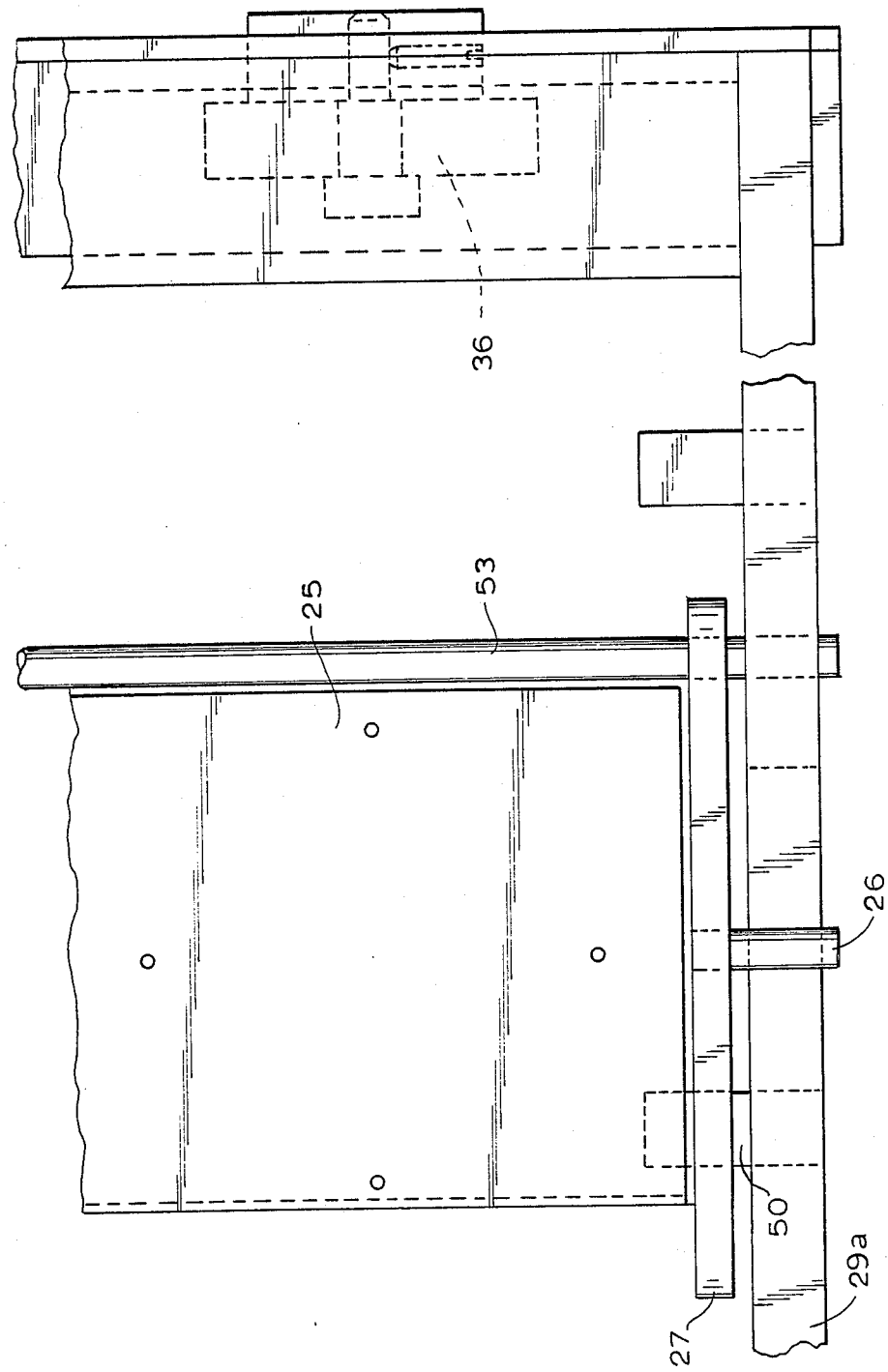
FIG. 5 is a top elevational view partly broken away of FIG. 4.

As is best shown in FIG. 5, a stop 50 is provided extending inwardly from side member 29a of carriage 16. When boards 25 are in their generally horizontal position, further downward movement is restrained by end frame members 27a and 27b of the boards 25 abutting the stop 50.

Figure 16:
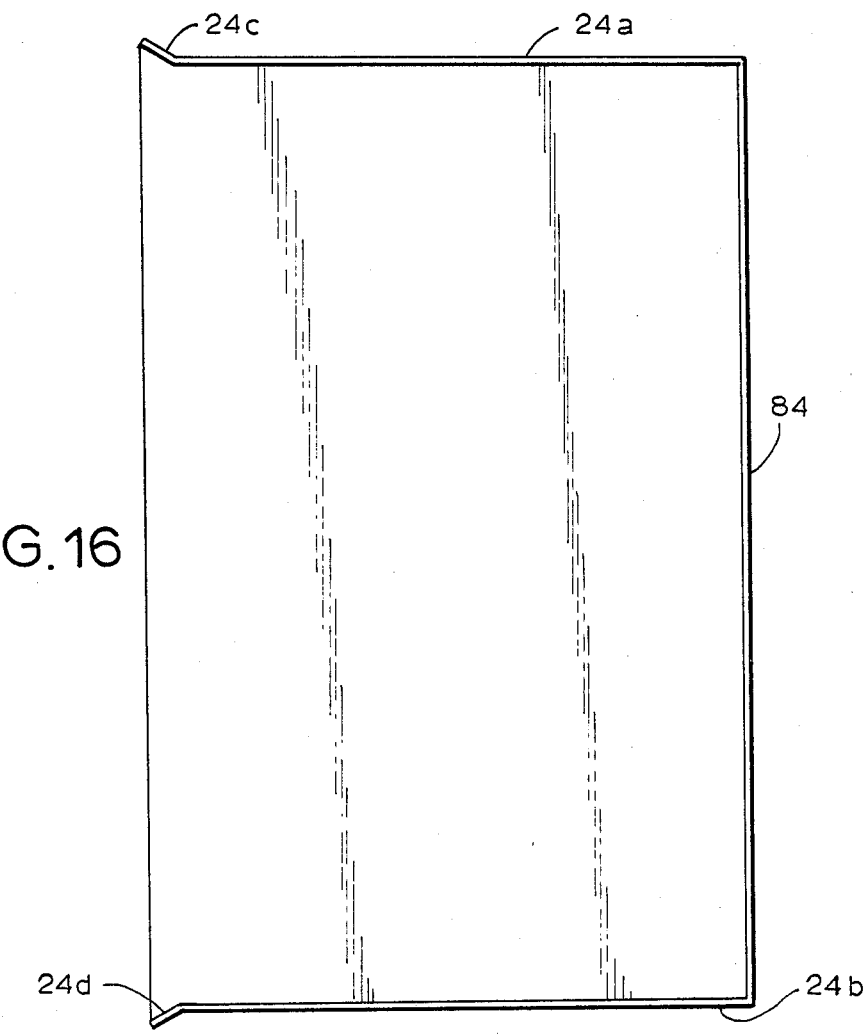
FIG. 16 is a top elevational view of the pair of guide rails of each shelf of the oven of FIG. 14.

Oven 24 is also specifically designed to readily receive the carriages. Each shelf of oven 24 includes a pair of spaced-apart guide rails 24a and 24b which constrain movement of the carriage within each shelf of the oven (FIG. 16). The guide rails 24a and 24b also include front beveled sections 24c and 24d extending inwardly which aid in guiding the carriage into the shelf between guide rails 24a and 24b.

In operation, after cooking in cooker 12, the bagels are placed on the pivotally mounted boards 25 of each carriage 16. In this position, boards 25 are in a generally horizontal configuration. Each carriage 16 is then placed on table 18. As aforedescribed, wheels 34 and 36 of the carriage immediately adjacent to top surface 31 of table 18 (i.e., second carriage 30) are placed on top of piggy-back rail 40 between flanges 41a and 41b of the table. The wheels of the next immediately adjacent carriage (i.e., first carriage 29) are placed on top of L-shaped rail supporting members 38 of second carriage 30 and are restrained from movement off of rail support member 38 by abutment post 53 which extends upwardly from second carriage 30 adjacent to L-shaped rail support member 38.

Figure 6:
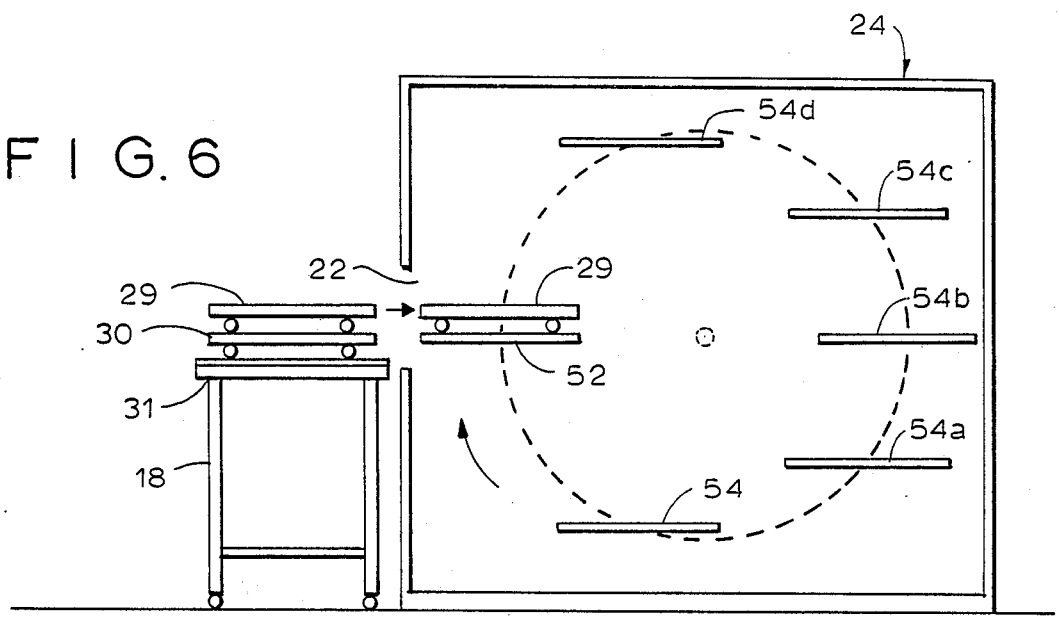
FIGS. 6 through 10 are schematic side elevational views illustrating the consecutive steps of a method of baking boiled food products.

After the carriages are vertically-stacked on table 18, the table is moved into a position adjacent to oven 24, as is shown in FIGS. 1 and 6. In this position, first and second carriages 29 and 30 are positioned adjacent to and aligned with opening 22 of oven 24. The latter is a generally rotary or ferris-wheel type oven having a plurality of shelves pivotally mounted about horizontal axes for movement in a vertical plane.

Figure 7:
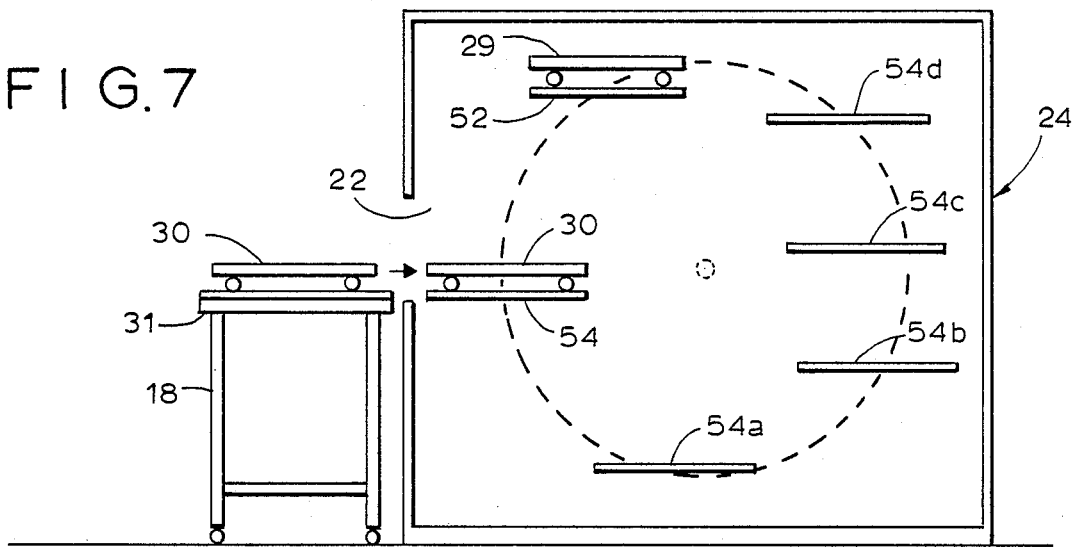
Figure 8:
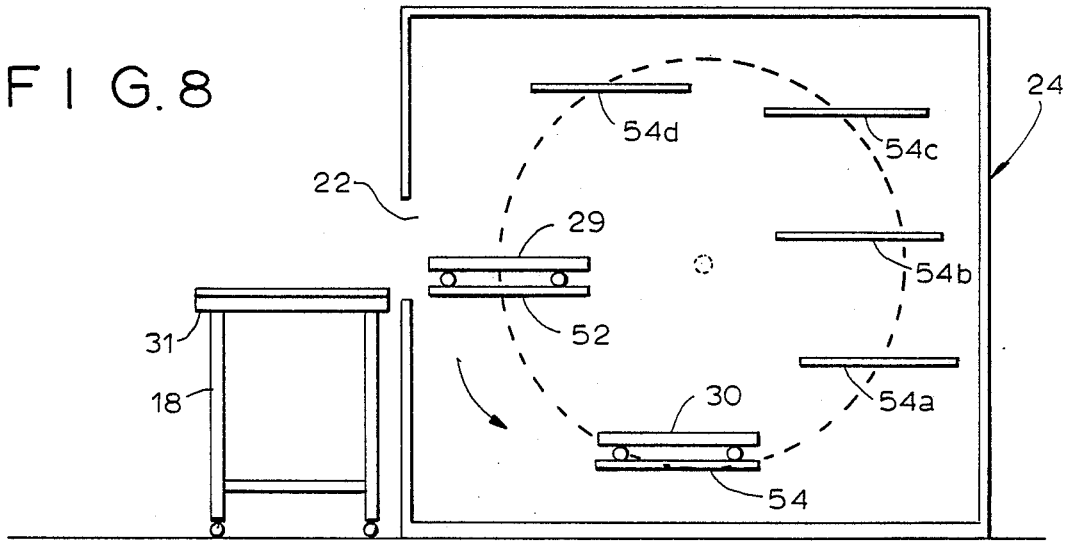
Figure 9:
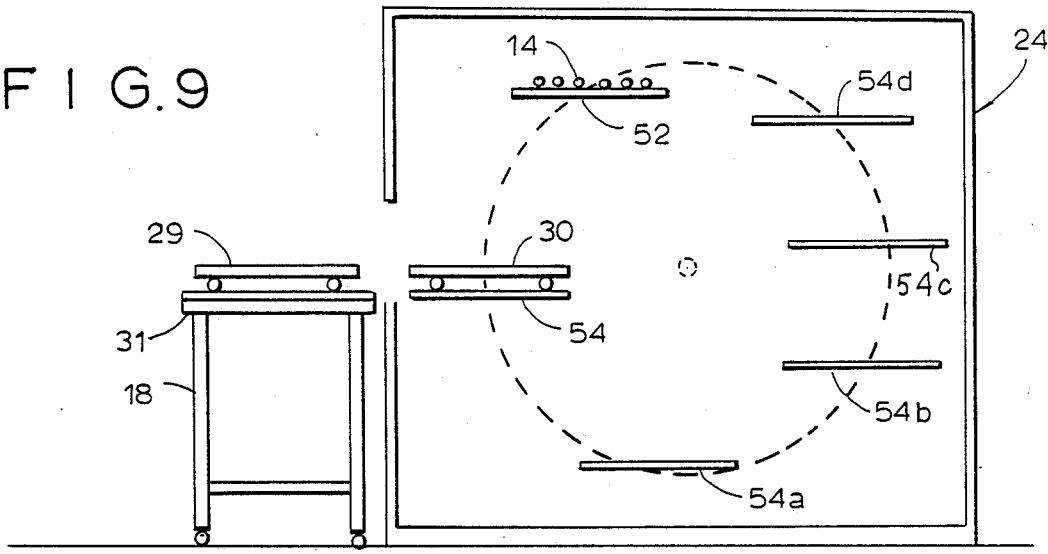
Figure 10:
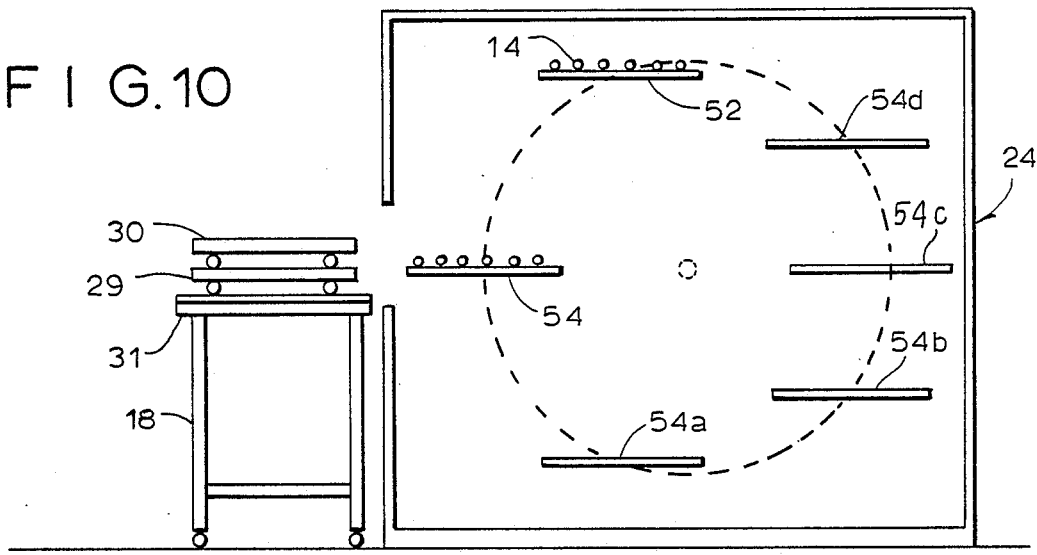

The sequence of consecutive steps of the carriages 29 and 30 being supported and subsequently removed from consecutive shelves in oven 24 is specifically illustrated in FIGS. 6 through 10. Initially, first carriage 29 is removed from table 18 and placed upon a first shelf 52 of oven 24 through opening 22. In this position, the bagels are supported on first carriage 29 on the plurality of boards 25 which are in their generally horizontal position. The oven is then rotated in a ferris wheel-like manner about center of rotation 55 in a clockwise direction such that its second shelf 54 is positioned adjacent to opening 22 (FIG. 7). Second carriage 30 is then removed from table 18 and placed on second shelf 54 of oven 24 through opening 22. In this position, the bagels are supported on second carriage 30 on the plurality of boards 25 which are in their generally horizontal position.

In the time taken to load the second shelf 54, the bagels on first shelf 52 will have dried enough so that the bagels thereon can be turned and the first carriage 29 removed. Thus, after rack 54 is loaded, the shelves of oven 24 are then rotated counterclockwise about center of rotation 55 such that first shelf 52 is brought back into a position adjacent to and aligned with opening 22. In this position, while first carriage 29 is still supported within oven 24, the trip levers 32 of first carriage 29 are rotated into their second position, as is shown in FIG. 4, by the operator turning trip levers 32 through opening 22. As a result of turning trip levers 32, each corresponding board 25 is angularly displaced from the horizontal axis of first carriage 29 such that the dried bagels fall onto first shelf 52 itself for subsequent baking. First carriage 29 is then removed from the oven 24 through opening 22 and placed on table 18 supported by top surface 31 of table 18. Oven 24 is then rotated in a clockwise position such that second shelf 54 is positioned adjacent to and aligned with opening 22 of oven 24. In this orientation, upon manual actuation, the trip levers 32 on second carriage 30 are rotated to their second position, as is shown in FIG. 4, such that the boards 25 of second carriage 30 are angularly displaced from the horizontal axis of second carriage 30. The dried bagels previously supported on second carriage 30 thereby fall onto the second shelf 54 itself for subsequent baking. Second carriage 30 is then removed from oven 24 through opening 22 and supported on top of first carriage 29 on movable table 18.

The above described operation is then continued by loading shelves 54a, 54b and then 54c and 54d until each shelf has had bagels flipped over onto them, and their associated carriage is removed from the oven.

While this process is going on, the bagels on the previously loaded shelves are baking in the oven. By rotation of the shelves in the oven at a predetermined speed and with the oven at an appropriate temperature, by the time shelf 54d is loaded, the bagels on shelf 52 will be fully baked and ready for removal. After they are removed, shelf 52 can be reloaded and shelf 54 moved to position for unloading and reloading. As a result of this method of baking boiled food products, after drying, a series of bagels may be turned over onto the oven shelves without the necessity of removing the bagels from the oven. In addition, this assembly eliminates the need for the operator to turn over the individual bagels manually. Further, this process provides a steady stream of baked goods from the oven in a continuous loading and unloading procedure.

Figure 11:
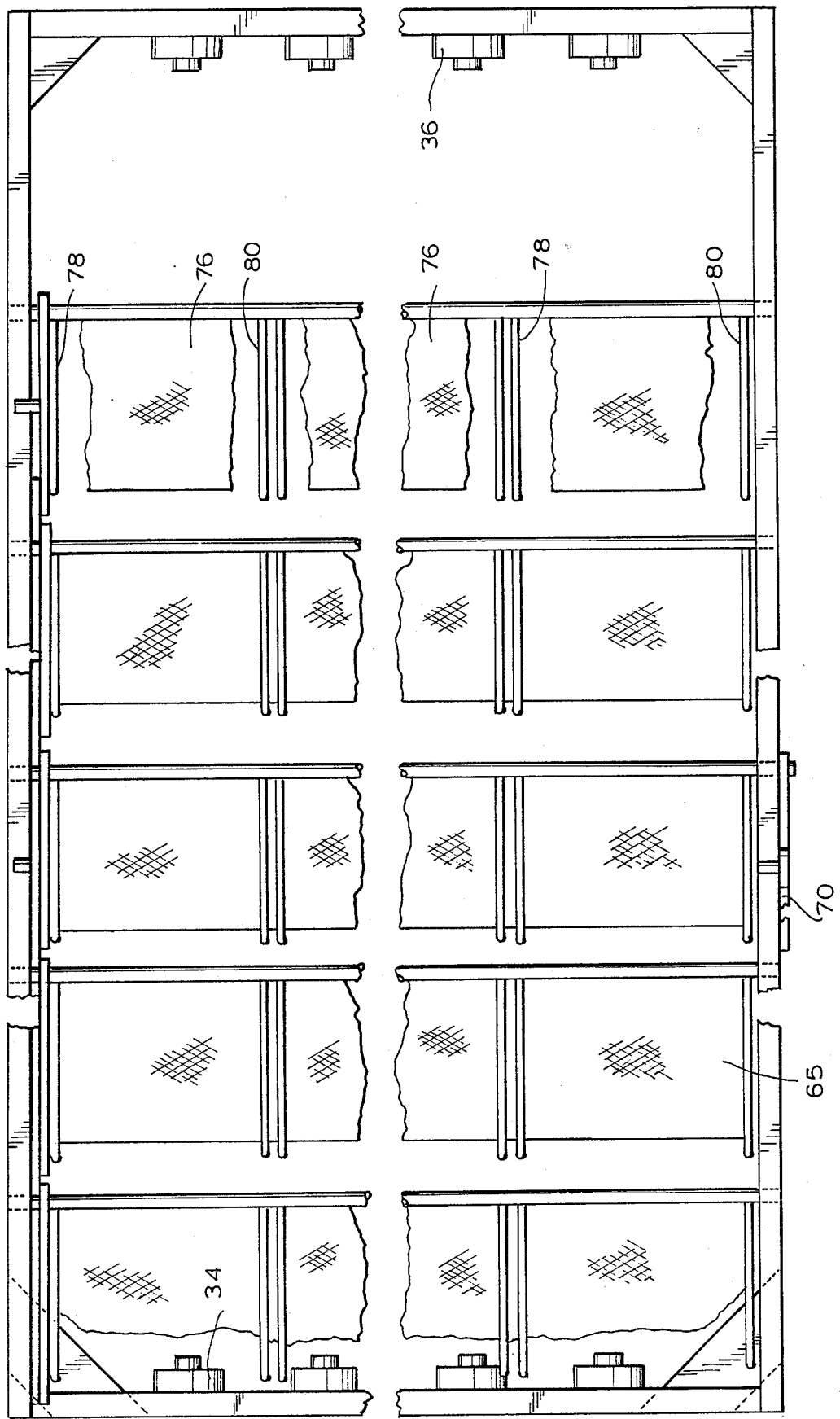
FIG. 11 is a top elevational view of a second preferred embodiment of a carriage for holding a series of boiled food products.
Figure 12:
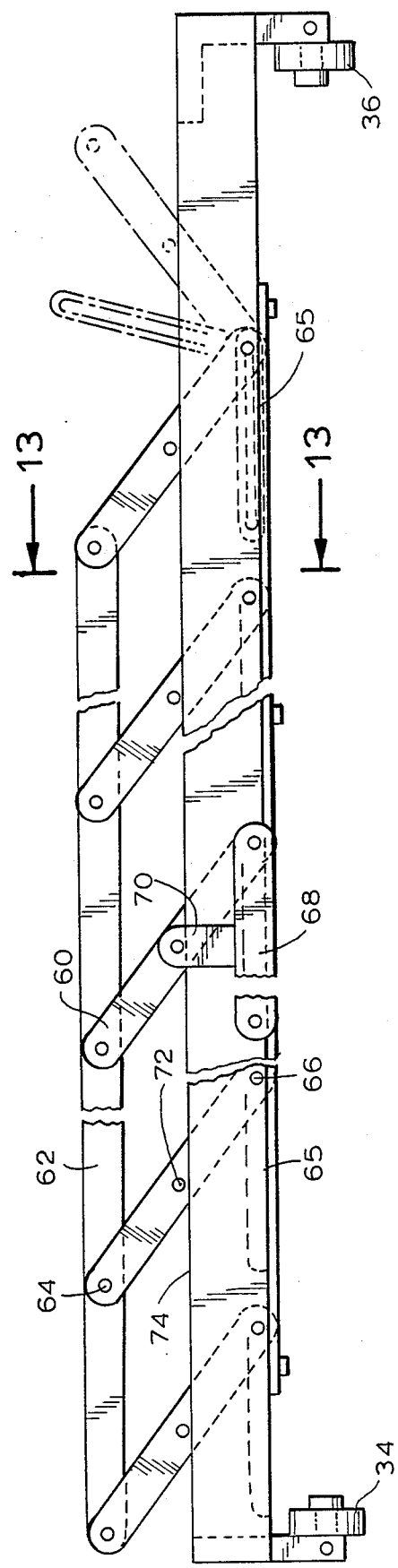
FIG. 12 is a front elevational view partly broken away of the second preferred embodiment of FIG. 11.
Figure 13:
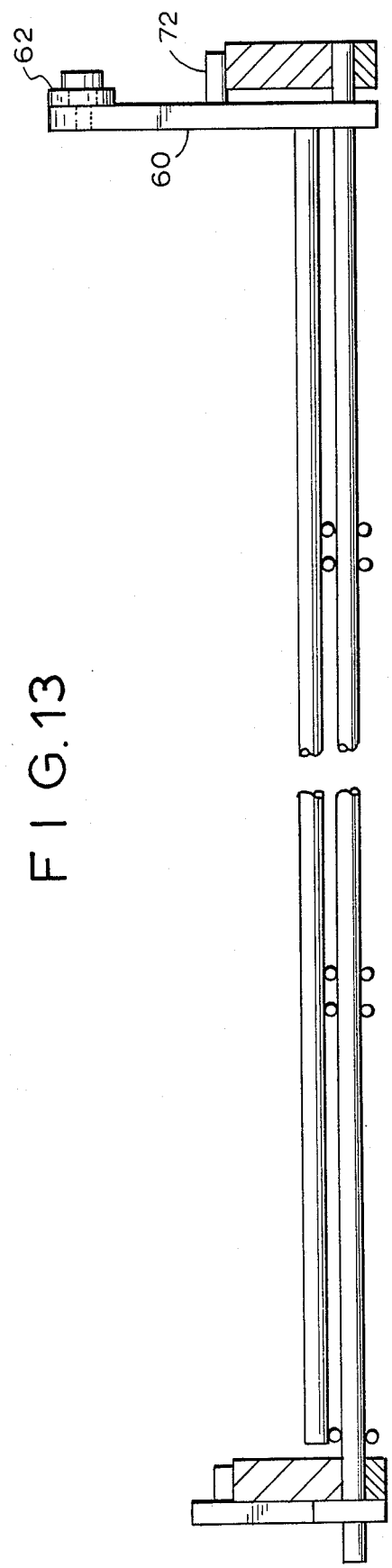
FIG. 13 is an end view of the second preferred embodiment taken along line 13—13 of FIG. 12.

A second preferred embodiment of the present invention is shown in FIGS. 11 through 13. In this second embodiment, each pivot lever 60 of a carriage, such as 16, is operatively connected to a horizontal support or tie bar 62 at junction 64. Each bagel board, such as 65, is operatively connected to the corresponding pivot lever at position 66. In order for the operator to turn all of the boards of a carriage at one time, a trip lever 68 is operatively connected to one of the pivot levers by a vertical support bar 70. As a result of the design of this second preferred embodiment, after the bagels have been dried in the oven and the carriage is presented adjacent to and aligned with opening 22 of oven 24, upon a rotational force being applied to trip lever 68 by the operator, each pivot lever 60 is rotated simultaneously as a result of the tie bar joining all the pivot levers. As a consequence thereof, each board 65 will rotate between first and second positions, as is shown in FIG. 4 (i.e. board 25). In this second position, all boards are angularly displaced from the horizontal axis of the carriage such that all the bagels on each carriage will fall simultaneously on the corresponding oven shelf. The rotational movement of the pivot levers 60 is limited by a stop 72 extending inwardly from the pivot levers and resting against the top surface 74 of each carriage when each board is in its first and second positions. This design eliminates separately turning each individual pivot lever 60 of each board 65 of the carriage 16 to have the bagels fall onto the carriage shelves.

Other than the differences herein described, the structure of the carriage illustrated in FIG. 11-13 is identical to that shown in FIGS. 1-5 except that each board 65 is lined with a Teflon coated or canvas surface 76 which is supported between corresponding partition members 78 and 80.

As shown in FIG. 14 through 18, the carriage 16 of FIGS. 11-13 may be used in conjunction with a second method for baking boiled food products. As a result of this method, a single carriage may be repeatedly utilized in multiple shelves of the rotatable oven.

Figure 15:
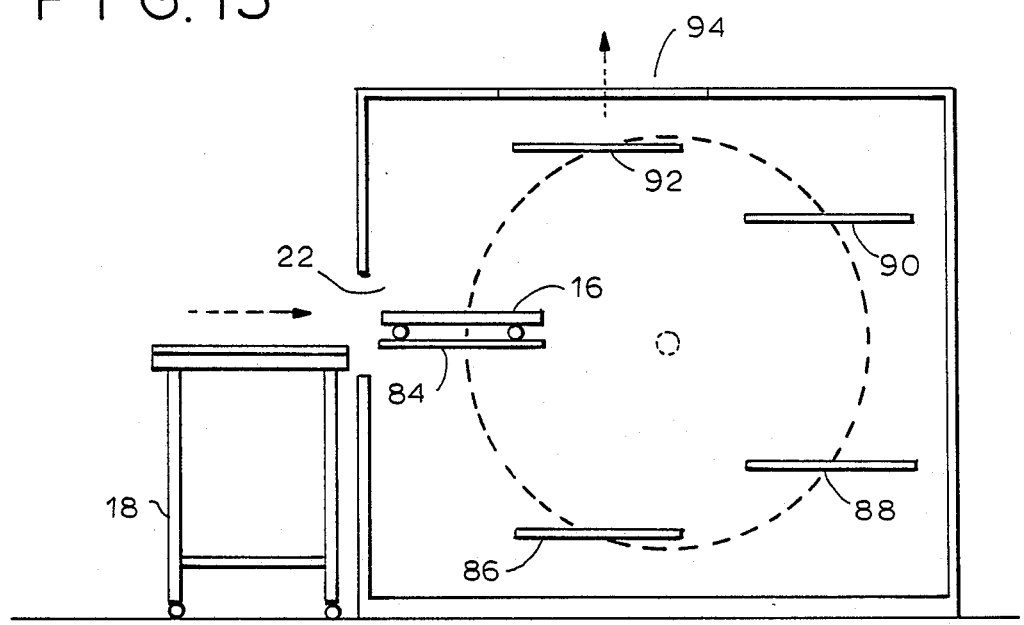
FIG. 15 is a schematic side elevational view illustrating the insertion of a single carriage in a first shelf of the oven of FIG. 14.

After cooking in cooker 12, the bagels are placed on the pivotably mounted boards 65 of carriage 16 which is supported upon moveable table 18 (FIG. 14). In this position, boards 65 are in a generally horizontal configuration. As aforedescribed, wheels 34 and 36 of the carriage immediately adjacent to top surface 31 of table 18 are placed on top of piggy-back rail 40 between flanges 41a and 41b of the table. The table is then moved into a position adjacent to oven 24 and aligned with opening 22 of oven 24 (FIG. 15).

The sequence of consecutive steps of this carriage being repeatedly used in multiple shelves of the oven is illustrated in FIGS. 15 through 18. Initially, carriage 16 is removed from table 18 and placed upon a first shelf 84 of oven 24 through opening 22. Front beveled sections 24c and 24d of guide rails 24a and 24b aid in guiding the carriage into first shelf 84 between guide rails 24a and 24b (FIG. 16). In this position, carriage 16 is locked between spaced-apart guide rails 24a and 24b and thereby constrained from lateral movement within the shelf of the oven. The carriage remains in this first shelf for one complete revolution (approx. 2 minutes) of the oven until the first shelf is positioned immediately adjacent to opening 22 of oven 24. In this position, trip lever 68 of carriage 16 is lifted upwardly such that each board 65 of carriage 16 is angularly displaced simultaneously so that the bagels are flipped over onto the first shelf 84 of oven 24 for subsequent baking. Carriage 16 is then removed from the first shelf 84 through opening 22.

Carriage 16 is once again loaded with bagels being mounted on the plurality of bagel boards 65. The oven is rotated such that a second shelf 86 is brought into a position adjacent to opening 22 of the oven 24. The carriage is re-inserted into second shelf 86 through opening 22 of oven 24. The oven is rotated one complete revolution until second shelf 86 is in a position adjacent to opening 22 of oven 24. Trip lever 68 of carriage 16 is again lifted upwardly such that each board 65 of carriage 16 is angularly displaced simultaneously thereby flipping over the bagels onto the second shelf 86 itself. The carriages once again removed from the oven. The bagel carriage is loaded into third 88, fourth 90, fifth 92, etc. shelves of the oven in a similar manner. After approximately 15 minutes in the oven, the baked bagels in each shelf of the oven are removed through a door 94 positioned at the top of the oven easily accessible to the operator (FIGS. 14 and 15). Thus, a single carriage may be repeatedly used in multiple shelves of oven 24.

While the present invention has been particularly shown and described with reference to a preferred embodiment, it will be readily appreciated by those of ordinary skill in the art that various changes and modifications may be made without departing from the spirit and scope of the invention. It is intended that the appended claims be interpreted as including the foregoing as well as various other such changes and modifications.

I claim:

1. A device for holding a series of boiled food products comprising a plurality of vertically-stacked carriages having pivotally mounted boards thereon for holding the boiled food products wherein the carriages are positioned adjacent to and aligned with an opening of a rotatable oven on a movable table such that each carriage may be disposed within the oven in successive shelves; wherein the shelves support the carriages within the oven and wherein each board has a lever movable between a first position, wherein the boiled food products rest on the boards in a generally horizontal position, and a second position, wherein the lever is rotated permitting the boiled food products to fall onto the shelves of the oven.

2. The device for holding a series of boiled food products as set forth in claim 1 wherein each shelf of the successive shelves includes a pair of guide rails which constrain lateral movement of the carriage within the shelf.

3. The device for holding a series of boiled food products as set forth in claim 2 wherein each guide rail has a beveled section extending inwardly to guide the carriage into the shelf between the guide rails.

4. The device for holding a series of boiled food products as set forth in claim 1 wherein the boards may be pivoted in the opening of the rotatable oven.

5. A device for holding a series of boiled food products comprising a carriage having a plurality of boards pivotally mounted thereon and supported above a shelf of an oven, each board having a lever movable between a first position, wherein the boiled food products rest on the boards in a generally horizontal position, and a second position, wherein each lever is rotated permitting the boiled food products to fall onto the shelf, wherein each shelf includes a pair of guide rails which constrain lateral movement of the carriage within the shelf.

6. The device for holding a series of boiled food products as set forth in claim 5 wherein each guide rail has a beveled section extending inwardly to guide the carriage into the shelf between the guide rails.

7. The device for holding a series of boiled food products as set forth in claim 5 wherein said carriage is positioned on a movable table.

8. The device for holding a series of boiled food products as set forth in claim 7 wherein multiple carriages can be vertically-stacked on the movable table.

9. The device for holding a series of boiled food products as set forth in claim 7 wherein the movable table can be moved into a position adjacent to an opening of a rotatable oven.

10. The device for holding a series of boiled food products as set forth in claim 5 and further including a support bar means operatively connected to each lever such that each lever is moved simultaneously between its first and second positions.

11. The device for holding a series of boiled food products as set forth in claim 5 wherein the carriage may be repeatedly used in multiple shelves of the oven.

12. A device for holding a series of boiled food products comprising a carriage having a plurality of boards pivotally mounted thereon and supported above a shelf of an oven, each board being operatively connected to a pivot lever, each pivot lever being cooperatively retained in the same angular displacement with respect to the horizontal axis of the carriage by a horizontal tie bar, one of the pivot levers being operatively connected to a trip lever which is movable between a first position, wherein the boiled food products rest on the boards in a generally horizontal position, and a second position angularly displaced from the horizontal axis of the carriage, wherein the boards are angularly displaced such that the boiled food products fall onto the shelf of the oven.

13. The device for holding a series of boiled food products of claim 12 wherein the trip lever is operatively connected to one of the pivot levers by means of a vertical support bar.

* * * * *